United States Patent
Ghelmansarai

(10) Patent No.: US 8,436,313 B2
(45) Date of Patent: May 7, 2013

(54) DETECTORS AND SYSTEMS AND METHODS OF USING THEM IN IMAGING AND DOSIMETRY

(75) Inventor: Farhad Ghelmansarai, Danville, CA (US)

(73) Assignee: PerkinElmer Holdings, Inc., Waltham, MA (US)

( * ) Notice: Subject to any disclaimer, the term of this patent is extended or adjusted under 35 U.S.C. 154(b) by 3 days.

(21) Appl. No.: 13/168,250

(22) Filed: Jun. 24, 2011

(65) Prior Publication Data
US 2012/0326044 A1     Dec. 27, 2012

(51) Int. Cl.
*G01T 1/02*     (2006.01)
(52) U.S. Cl.
USPC .................................................. 250/370.07
(58) Field of Classification Search ............... 250/370.01–370.15; 378/98.8
See application file for complete search history.

(56) References Cited

U.S. PATENT DOCUMENTS

| | | | |
|---|---|---|---|
| 6,445,767 B1 * | 9/2002 | Karellas | 378/98.8 |
| 2005/0116173 A1 | 6/2005 | Hristov | |
| 2007/0238957 A1 | 10/2007 | Yared | |
| 2009/0101841 A1 | 4/2009 | Boyden | |
| 2009/0121142 A1 | 5/2009 | Heismann | |

OTHER PUBLICATIONS

ISR/WO for PCT/US2012/043794 mailed on Sep. 14, 2012.

* cited by examiner

*Primary Examiner* — Kiho Kim
(74) *Attorney, Agent, or Firm* — Rhodes IP PLC; Christopher R. Rhodes

(57) ABSTRACT

Certain embodiments described herein are directed to devices and systems that can be used for direct and indirect detection of radiation such as X-rays. In certain examples, the device can include a modulator optically coupled to a sensor. In some examples, the modulator can be configured to switch between different states to provide an imaging signal in one state and a dosimetry signal in another state.

22 Claims, 2 Drawing Sheets

DETECTORS AND SYSTEMS AND METHODS OF USING THEM IN IMAGING AND DOSIMETRY

TECHNOLOGICAL FIELD

Certain features, aspect and embodiments are directed to devices that can be used in both imaging and dosimetry applications. In particular, certain embodiments described herein are directed to a detector that is operative to detect an imaging signal when a modulator optically coupled to the detector is in a first configuration and a dosimetry signal when the modulator is in a second configuration.

BACKGROUND

Detectors used in X-ray detection are typically different for imaging applications and radiotherapy applications. When detecting radiation doses used in radiotherapy applications, false or inaccurate readings can result due to detectors insensitivity toward certain wavelengths of light.

SUMMARY

In a first aspect, a device comprising an emitter, an optical modulator coupled to the emitter and configured to provide an imaging signal in a first state and to provide a dosimetry signal in a second state, in which the modulator is configured to switch between the first state and the second state, and a detector operative to receive a signal provided by the modulator and to detect the imaging signal in the first state of the modulator and the dosimetry signal in the second state of the modulator is provided.

In certain embodiments, the modulator can comprise a plurality of liquid crystals, e.g., a plurality of twisted nematic liquid crystals. In other embodiments, the modulator can comprise nanoparticles, quantum dots or both. In some examples, the modulator can also include an optical element such as, for example, a lens, polarizer, filter or the like. In some embodiments, the device can include a power source configured to provide an electric field to the modulator to switch the state of the modulator. In other embodiments, the device can include a power source configured to provide a magnetic field to the modulator to switch the state of the modulator. In some examples, the detector can include an amorphous material such as, for example, amorphous silicon, amorphous selenium or other amorphous materials. In certain examples, the detector comprises an amorphous silicon panel. In other examples, the detector comprises a charged coupled device, a complementary metal oxide semiconductor (CMOS) device, both or combinations and variants thereof. In some examples, the imaging signal can be configured as light detected when the modulator is in the imaging mode. In other examples, the dosimetry signal can be configured as ionizing radiation detected when the modulator is in the dosimetry mode. In some examples, the emitter comprises a scintillant, whereas in other examples, the emitter may be a source of X-rays or other ionizing or non-ionizing radiation. In certain embodiments, the second state of the modulator can be configured to block substantially all light received from the emitter. In other embodiments, the second state of the modulator can be configured to alter output intensity of light received from the emitter.

In some examples, the first state of the modulator can be configured to pass substantially all light received from the emitter. In certain embodiments, the detector can be configured as a flat panel detector, the emitter comprises a scintillant and the modulator comprises a plurality of liquid crystals, e.g., twisted nematic liquid crystals. In certain examples, the modulator comprises a dopant. In certain embodiments, the detector can be coupled to a motor configured to rotate the detector with respect to the position of the modulator. In some embodiments, the modulator can be configured to be transparent in the first state and configured to be opaque in the second state. In some examples, the detector is operative to measure an absolute radiation dose when the modulator is in the second state. In other examples, the detector is operative to image a tumor when the modulator is in a first state and operative to determine a radiation dose provided to the tumor when the modulator is in a second state. In some configurations, the detector is operative to measure X-rays indirectly when the modulator is in the first state and operative to measure X-rays directly when the modulator is in the second state. In other configurations, the detector is operative to measure a combination of direct and indirect X-rays. The combination of direct and indirect measurements can provide the benefit of both direct and indirect detection of X-rays. In some examples, the emitter, the modulator and the detector can be physically coupled. In certain examples, the device can include a support coupled to the detector.

In some examples, the device can include a processor electrically coupled to the detector and configured to determine the amount of light received by the detector in the first state of the modulator and further configured to determine the amount of radiation received by the detector in the second state of the modulator.

In another aspect, a device configured to switch between an imaging mode and a dosimetry mode, the device comprising a detector optically coupled to a modulator, the modulator configured to provide a first signal to the detector in the imaging mode and to provide a second signal, different from the first signal, to the detector in the dosimetry mode is described.

In certain embodiments, the modulator can be configured to provide substantially all light received by the modulator in the imaging mode. In other embodiments, the modulator can be configured to block substantially all light received by the modulator in the dosimetry mode. In certain examples, the modulator comprises a plurality of liquid crystals, e.g., twisted nematic liquid crystals. In other examples, the modulator can include nanoparticles or quantum dots. In some examples, the modulator can be electrically coupled to a power source effective to switch the modulator from providing the first signal to providing the second signal. In certain examples, the detector comprises an amorphous silicon panel. In other examples, the detector comprises a charged coupled device or a CMOS device. In certain embodiments, the detector comprises a flat panel detector and the modulator comprises a plurality of liquid crystals, e.g., twisted nematic liquid crystals.

In an additional aspect, a device comprising a switch configured to receive energy from a source and to provide a first signal comprising light in a first mode and to provide a second signal different from the first signal and comprising ionizing radiation in a second mode, and a detector coupled to the switch and configured to image when the switch is in the first mode and configured to measure a radiation dose when the switch is in the second mode is disclosed.

In certain embodiments, the switch can be configured to provide substantially all light energy from the source to the detector in the first mode and to substantially block all light energy from the source to the detector in the second mode. In other embodiments, the switch comprises a plurality of liquid crystals, e.g., twisted nematic liquid crystals. In some examples, the device can include a power source electrically coupled to the plurality of liquid crystals and effective to switch the switch from the first mode to the second mode. In additional examples, the switch can include an optical element such as, for example, a lens, filter, or other optical element.

In another aspect, a device comprising means for modulating energy received from emitting means, the means for modulating energy configured to provide a first output in an first mode and a second output in a second mode, in which the first and second outputs are different and in which the means for modulating energy is configured to switch between the first mode and the second mode, and means for detecting a signal provided from the means for modulating energy is provided. In some examples, the means for modulating energy can be configured to provide a light signal as the first output and configured to provide an ionizing radiation signal as the second output. In other examples, the means for modulating energy comprises a plurality of liquid crystals. In additional examples, the means for detecting a signal comprises an amorphous silicon panel. In further examples, the means for modulating energy further comprises optical means for performing an optical operation on the energy received from the emitting means.

In an additional aspect, a detector configured to detect signals in both an imaging mode and a dosimetry mode, the detector comprising a sensor optically coupled to a modulator, the modulator configured to provide a first signal to the sensor in the imaging mode and to provide a second signal, different from the first signal, to the sensor in the dosimetry mode is described.

In certain embodiments, the modulator can be configured to pass substantially all light received by the modulator to the sensor in the imaging mode. In other embodiments, the modulator can be configured to block substantially all light received by the modulator in the dosimetry mode. In further embodiments, the modulator comprises a plurality of liquid crystals. In additional embodiments, the modulator comprises nanoparticles. In some embodiments, the modulator can be electrically coupled to a power source effective to switch the modulator from providing the imaging signal to providing the dosimetry signal. In further embodiments, the sensor comprises amorphous silicon or amorphous selenium. In other embodiments, the sensor comprises a charged coupled device, a CMOS sensor or combinations or variants thereof. In some embodiments, the sensor comprises amorphous silicon and the modulator comprises a plurality of twisted nematic liquid crystals. In certain examples, the modulator can be configured to pass indirect radiation from a scintillant as the first signal in the imaging mode and to pass X-ray photons as direct radiation from a source as the second signal in the dosimetry mode.

In another aspect, a device comprising means for modulating a X-ray radiation signal using a control signal, and means for detecting the modulated X-ray radiation signal is provided. In certain embodiments, the means for modulating the X-ray radiation signal comprises a plurality of twisted nematic liquid crystals. In other embodiments, the means for detecting the modulated X-ray radiation signal comprises a sensor. In further embodiments, the sensor comprises a charged coupled device, a CMOS sensor, amorphous silicon or combinations thereof. In other examples, the means for modulating the X-ray radiation signal comprises a voltage source configured to provide the control signal.

In an additional aspect, a device comprising an emitter, an optical modulator coupled to the emitter and configured to provide an imaging signal in a first state, a dosimetry signal in a second state and a hybrid signal comprising a combination of the imaging signal and the dosimetry signal in a third state, in which the modulator is configured to switch between the first state and the second state, and a detector operative to receive a signal provided by the modulator and to detect the imaging signal in the first state of the modulator, the dosimetry signal in the second state of the modulator and the hybrid imaging signal in the third state of the modulator is described.

In some examples, the modulator comprises a plurality of liquid crystals. In other examples, the modulator comprises nanoparticles, quantum dots or both. In additional examples, the modulator comprises an optical element. In further examples, the optical element comprises a polarizer. In additional examples, the device comprises a power source configured to provide an electric field to the modulator to switch the state of the modulator. In some examples, the device comprises a power source configured to provide a magnetic field to the modulator to switch the state of the modulator. In certain embodiments, the detector can include one or more of an amorphous silicon panel, a charged coupled device or a complementary metal oxide semiconductor (CMOS) device.

In certain examples, the imaging signal can be configured as light detected when the modulator is in the imaging mode. In further examples, the dosimetry signal can be configured as ionizing radiation detected when the modulator is in the dosimetry mode. In other examples, the emitter comprises a scintillant. In some examples, the second state of the modulator can be configured to block substantially all light received from the emitter. In additional examples, the second state of the modulator can be configured to alter output intensity of light received from the emitter. In other examples, the first state of the modulator can be configured to pass substantially all light received from the emitter. In some embodiments, the third state of the modulator can be configured as a state between the first state of the modulator and the second state of the modulator. In additional embodiments, the detector can be configured as a flat panel detector, the emitter comprises a scintillant and the modulator comprises a plurality of liquid crystals. In some embodiments, the modulator comprises a dopant. In other embodiments, the detector can be coupled to a motor configured to rotate the detector with respect to the position of the modulator. In further embodiments, the modulator can be configured to be transparent in the first state and configured to be opaque in the second state. In additional embodiments, the detector can be operative to measure an absolute radiation dose when the modulator is in the second state. In other embodiments, the detector can be operative to image a tumor when the modulator is in a first state and operative to determine a radiation dose provided to the tumor when the modulator is in a second state. In additional embodiments, the detector can be operative to measure X-rays indirectly when the modulator is in the first state, can be operative to measure X-rays directly when the modulator is in the second state and can be operative to measure a combination of indirect and direct X-rays when the modulator is in the third state. In some examples, the emitter, the modulator and the detector are physically coupled.

Additional features, aspects and examples are described in more detail below.

BRIEF DESCRIPTION OF THE FIGURES

Certain illustrative embodiments are described in more detail below with reference to the accompanying figures in which.

Figure 1:
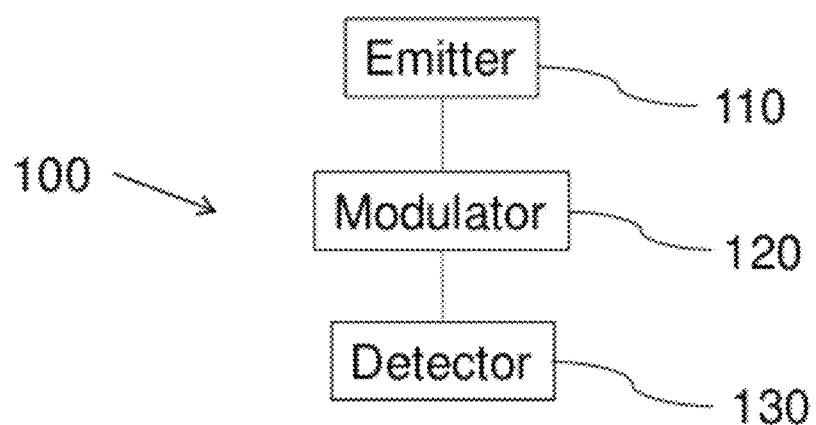
FIG. 1 is a block diagram of one embodiment of a system, in accordance with certain examples.

It will be recognized by the person of ordinary skill in the art, given the benefit of this disclosure, that the relative positions and sizes of the components in the figures are not limiting and that no particular size, thickness or arrangement is implied as being required based on the representations of the components shown in the figures.

DETAILED DESCRIPTION

In the illustrative embodiments described below, certain components are included in the devices and systems. Depending on the desired configuration of the device, it may be desirable to include additional components, omit one or more components or rearrange or substitute other components into the devices and systems.

In certain examples described herein, the detector can be configured to detect direct radiation, indirect radiation or a hybrid version thereof comprising both direct and indirection radiation. For example, in certain states of the modulator described herein, the detector can detect direct radiation from an emitter, whereas in other states the detector can detect indirect radiation by detecting light emitted from a scintillant or an emitter other than the original radiation source. In some configurations, the detector can detect hybrid forms of the radiation that are a mixture of direct and indirect radiation. Illustrations of these forms and signals are described in more detail herein.

In other examples described herein, the devices can be used to modulate a radiation signal. For example, the devices can be used to modulate an X-ray signal similar to modulation methods used in the modulation of RF, microwave, radio waves and other radiation sources. In certain instances, a modulation signal can be added to the signal from the emitter, to the signal provided from the modulator or to the signal received by the detector. In one configuration, the signal which will be modulated can be connected to a light modulator input signal and configured as an electrical signal. The signal detected by the detector can be a function of (or representative of) this modulator signal, e.g., controllable and configurable by the modulator input signal. In this configuration, the modulator can be configured to provide some controlled amount of light to the detector such that the amount and nature of the signal provided to the detector can be tuned upstream of the detector. Other way and methods of modulation will be readily selected by the person of ordinary skill in the art, given the benefit of this disclosure.

In certain embodiments, X-ray systems can take different forms including those used to image structures inside the human body or internal structures of other subjects or articles. In other configurations, the X-ray system may be configured to provide radiation to a desired site for treatment of a tumor, mass or other tissue or to otherwise expose a selected area of an article to X-rays. In certain instances, a single X-ray system may not be designed to provide both imaging and delivery of radiation, e.g., radiation therapy. For example, the detector in many imaging systems may be overly sensitive to low energy photons present during radiation therapy such that use of a single detector to image and determine a delivered radiation dose does not provide accurate dose verifications. To attempt to increase accuracy, correction factors may be used, but application of these corrections factors may still not provide a faithful measure of the delivered radiation dose.

In certain configurations of the devices and systems described herein, a system that includes a detector operative to detect an imaging signal and a dosimetry signal can be used to provide for switching between imaging and dosimetry measurements. In some embodiments, the detector can be configured to receive a signal provided by a modulator and to detect an imaging signal in the first state of the modulator and a dosimetry signal in a second state of the modulator. In certain instances, the detector may generally remain in the same mode or state during operation of the system and the state of the modulator can determine whether or not an imaging signal is provided to the detector or if a dosimetry signal is provided to the detector. While the detector may remain in the same mode or state, the detector need not remain stationary or positioned in the same manner when detecting the different signals.

In certain embodiments, the systems described herein can be used in many different types of radiographic applications including, but not limited to, mammography, tomography, dental imaging procedures such as orthopantomograms, in fluoroscopic procedures such as angiography, biopsies and the like. The systems can be used with and without radiocontrast agents. One attribute of the systems described herein is the system may also be used in dosimetry or radiotherapy applications including, but not limited to, external beam radiotherapy, brachytherapy, particle therapy, and the like. If desired, radioisotope therapy may also be performed in combination with radiotherapy using the systems described herein.

In certain embodiments, an illustration of a system is shown in FIG. 1. The system 100 includes an emitter 110, a modulator 120 and a detector 130. While shown as separate components in the system 100, the modulator may be deposited as a layer or thin film on the detector 130 or on an exit aperture of the emitter 110. As described herein, other configurations where a modulator 120 is part of the emitter 110 or the detector 130 are also possible, e.g., where the modulator is present in a lens or panel that can be coupled to the emitter 110 or the detector 130. In operation of the system 100, the emitter 110 can provide a desired light or energy emission, e.g., in the form of X-ray photons, which are provided to the modulator 120. The modulator 120 may be configured to perform one or more optical operations on the incident energy from the emitter 110 such that a desired output from the modulator 120 is achieved. The modulator 120 may provide the desired output to the detector 130. The detector 130 can be configured to detect different signals from the modulator 120. For example, the modulator 120 may provide an imaging signal in a first state and a dosimetry signal in a second state. The detector 130 can be configured to detect the imaging signal and the dosimetry signal without the need for two different types of detectors. Illustrations of imaging signals, dosimetry signals and detector configurations for detecting them are described in more detail herein.

In certain embodiments, the emitter 110 can be configured as a source that provides some form of radiation to the modulator 120. The exact form of radiation can vary depending on the intended use of the device, and in certain examples, the radiation may be non-ionizing radiation or ionizing radiation. Illustrative types of non-ionizing radiation include, but are not limited to, near ultraviolet, visible, infrared, microwave and radio waves. In certain embodiments, non-ionizing radiation may not include enough energy to ionize other molecules, but it may induce formation of certain species or initiate photochemical reactions that can be useful in imaging and/or radiation therapy. In other instances, it may be desirable to use non-ionizing radiation with contrast agents or dyes to increase imaging capabilities.

In certain examples, it may be desirable to use an emitter than can provide ionizing radiation so that the emitter can be used for simultaneous imaging and dosimetry applications. Illustrative types of ionizing radiation include, but are not limited to, far ultraviolet, X-rays and gamma rays. In certain embodiments, the particle form of the ionizing radiation can vary depending on the selected type of ionizing radiation and includes, but is not limited to, alpha particles, beta particles, and neutrons. These particles can be used to provide direct ionizing radiation or may be used in a source to provide a different type of radiation that can be provided from the emitter.

In certain embodiments, the devices described herein may include more than a single type of source. For example, a non-ionizing source may be present to perform certain types of imaging, e.g., thermal measurements, ultrasonic measurements, etc., and an ionizing source can be present and used for radiation therapy. In other configurations, two or more non-ionizing sources or two or more ionizing sources can be present in the device. Where two or more sources are present, the modulator and detector can be selected such that a single detector is operative for use in both imaging and dosimetry applications.

In certain examples, the emitter 110 may be configured as a source suitable for medical radiography and radiotherapy. Radiography broadly refers to the use of electromagnetic radiation to view objects or internal structures, while radiotherapy broadly refers to the use of electromagnetic radiation to treat a tissue or otherwise to control growth of cells or tissues. In radiography applications, the systems described herein can be used to image internal body structures based on the different densities of surrounding structures. The emitter 110 can be configured to provide a beam of X-rays toward an object or portion thereof. In some examples, the emitter 110 can be configured as an X-ray generator. In certain embodiments, an X-ray generator can include an X-ray tube which includes an electrode pair. The cathode of the X-ray tube may be configured to direct a stream of electrons toward an anode. As electrons collide with the anode, a portion of the energy may be emitted as X-rays while other energy can be emitted as heat or energy other than X-rays. Typical anode construction may include tungsten, molybdenum, copper or other materials that can emit X-rays after collision by electrons. The X-ray generator may also include other accessory devices such as cooling systems or the like. In operation of a typical X-ray generator, the cathode is heated to a high temperature that causes emission of electrons from the cathode. An electric field between the cathode and the anode directs electrons emitted from the cathode toward the anode at very high speed. Electrons from the cathode typically strike the anode at an angled focal spot. Some of the kinetic energy of the emitted electrons is converted into X-ray photons, which are typically emitted in all directions from the focal spot. To provide a focused beam of X-ray photons suitable for use in radiographic applications, the X-ray generator may include a small window that permits X-ray photons emitted at certain angles to exit the X-ray generator while X-ray photons emitted at other angles remain trapped or are absorbed by the X-ray generator.

In certain embodiments, the electrodes of the emitter may be produced using suitable metals or may be produced using carbon nanotubes, nanostructures or other suitable non-metal materials. For example, a film of carbon nanotubes can be used as a cathode that emits electrons in the presence of an electric field. The use of non-metals such as carbon nanotubes may provide desirable features as these X-ray generators can be operated at room temperature and without the need for substantial cooling.

In addition to the X-ray emitters noted above, the emitter may include other sources or devices to provide additional wavelengths or to provide indicia suitable for use in imaging applications and/or radiotherapy applications. For example, the emitter can include or be used with a visible laser which can provide a visible indicator of where the X-rays will strike the object. Such visible indicators may be desirable to position the object or tissue properly prior to application of radiotherapy.

In certain embodiments, the modulator of the systems described herein can be configured to provide a desired output depending on the state and components present in the modulator. In some examples, the modulator may be configured to substantially block light photons in one state and permit passage of light photons in another state. In other configurations, the modulator may be configured to attenuate or alter the light photons. For example, the modulator can be configured to filter out certain wavelengths of light while permitting others to pass to the detector. In additional configurations, the modulator can be configured to polarize the light in a desired plane. In further configurations, the modulator can be configured to change the wavelength of the light that is incident on the modulator from the emitter. Additional configuration of modulators will be recognized by the person of ordinary skill in the art, given the benefit of this disclosure, and illustrative modulator configurations are described in more detail herein. While certain illustrations are provided below in reference to certain types of modulators, the modulator may modulate light or other electromagnetic energy as desired.

In certain examples, the modulator can be configured as an optical modulator that is operative to pass light in one state and to block substantially all light in another state. The modulator can be switched between the states using one or more perturbations including, but not limited to, an electric field, a magnetic field, electric and magnetic fields, a quadrupolar field, a hexapolar field, heat, cooling and other types of perturbations that can be applied and removed as desired.

In certain embodiments, the modulator can be positioned between the emitter and the detector in a suitable manner and using suitable devices. In certain instances, the modulator may include a window sized and arranged to receive energy from the emitter. The window can be effective to prevent reflected X-rays or X-rays emitted at non-desired angles from entering the modulator and being provided to the detector. In certain instances, the modulator can be positioned upstream of the object to be imaged or provided with radiotherapy, e.g., between the emitter and the object to be imaged, whereas in other instances the modulator can be positioned downstream from the object, e.g., between the object to be imaged and the detector. The person of ordinary skill in the art will recognize, given the benefit of this disclosure, that the configuration of the modulator can vary if the modulator is upstream of the object versus being downstream of the object. For example, where the modulator is disposed on a detector, it may be disposed as a thin film on an entrance aperture of the detector or may be a separate component including its own support structure. In instances where the modulator is upstream of an object to be imaged, it may be disposed on the window of the emitter such that energy is modulated immediately upon exiting from the emitter or may be a separate structure that is optically coupled to the emitter. If desired, two or more modulators may be used with one modulator being positioned upstream of the object to be imaged or provided with radiation and the second modulator being positioned downstream of the object to be imaged or provided with radiation.

In certain examples, the modulator can include one or more materials with variable optical properties. For example, the modulator can include a material whose optical properties differ depending on the surrounding medium of the material or the particular environment that the modulator resides. In some examples, the materials used in the modulator are selected such that their default state is suitable for imaging applications. Switching of the materials to a different state can permit the system to be used in radiotherapy applications without the need for a different type of detector. In other examples, the materials used in the modulator are selected such that their default state is suitable for radiotherapy applications. Switching of the materials to a different state can permit the system to be used in imaging applications without the need for a different type of detector.

In certain embodiments, the modulator can include two or more states or modes such that the resulting signal provided from the modulator differs depending on its state. For example, the modulator can include an "off" state where substantially all light energy is permitted to pass from the emitter to a detector without any substantial optical operation or alteration and can include an "on" state where the modulator functions to alter the energy in at least some manner. In certain instances, the modulator is configured to block higher wavelengths of light, e.g., low energy light, when in the on state while still permitting lower wavelengths of light, e.g., high energy photons such as X-rays, to pass.

In some examples, the modulator can include one or more liquid crystals. In certain examples, the liquid crystals can be selected based on their ability to become "twisted" in the presence of an electric field. Such crystals are referred to in certain instances herein as twisted nematic (TN) liquid crystals. Without wishing to be bound by any particular scientific theory, TN liquid crystals provide different optical properties in the presence and the absence of an electric field. For example, TN liquid crystals can be configured to pass incident light when no electric field is applied and can block substantially all incident light (or certain types of incident light) when an electric field is present. In some embodiments, the modulator can be configured to provide an imaging signal when the electric field is turned off and a dosimetry signal when the electric field is turned on. For example, a modulator can be positioned between a scintillator and a sensor in a detector. In the absence of any electric field, light from the scintillator, e.g., indirect light, can be provided to a detector. This imaging signal from the modulator can be detected and used to construct an image of a desired structure. When the electric field is switched on, indirect light from the scintillator can be substantially blocked such that direct light from X-ray photons are detected by the detector but substantially no scintillator light reaches the detector. This dosimetry signal can be used to detect directly the amount of radiation provided to a desired site. As described below, the detector may remain stationary such that no positional differences in the detector are present when the modulator is switched between states or the detector can be moved to position itself differently when detecting an imaging signal and when detecting a dosimetry signal. Where liquid crystals are present, they can be present in a single layer, multiple layers or otherwise disposed in an effective manner to provide a desired optical result.

In certain examples, the liquid crystals can be effective to rotate about ninety degrees upon application of an electric field. Rotation of the liquid crystals by ninety degrees alters the optical properties of device such that light can be blocked by the liquid crystals. While the description above refers to the liquid crystals being "on" or "off," the liquid crystals may be configured such that a portion of indirect light is blocked but not all indirect light is blocked. This result may be possible by selection of certain types of liquid crystals, by doping the liquid crystals with materials to alter their optical properties or by using different conditions or temperatures with the liquid crystals. In addition, light may be attenuated by the modulator or the ratio of indirect/direct light can be controlled by the modulator to provide for increased capabilities of the system. Illustrative examples of TN liquid crystals include, but are not limited to, liquid crystals comprising yttrium, gadolinium, europium and combinations and oxides thereof. If desired, the liquid crystals can be inorganic liquid crystals, organic liquid crystals or combinations thereof. Other types of liquid crystals may also be used other than TN liquid crystals or non-TN liquid crystals can be used in combination with TN liquid crystals to provide a desired response from the modulator. In some examples, super twisted nematic liquid crystals can be used, e.g., where the crystals rotate through 270 degrees upon application of an electric field. If desired, retardation films or other films or materials can be used in combination with the liquid crystals.

In certain embodiments, the liquid crystals can be sandwiched between two or more support layers. For example, a support such as glass can be coated with a transparent metal oxide film, e.g., indium tin oxide, which is operative as an electrode. The electrode can be used to provide a voltage across the cell necessary for the orientation transition. If desired, a polymer alignment layer can be included and disposed on the electrode. The alignment layer can be effective to assist alignment of the liquid crystal molecules in a preferred direction. Anchoring of the crystals by the alignment layer can assist in forcing the molecules between the alignment layers to twist. Another support structure can be coated with a layer of polymer spacer beads or other suitable spacer materials. The spacers can act to maintain a uniform gap between the support structures where the liquid crystals are eventually placed. The two support structures can be sandwiched or placed together and the edges can be sealed with epoxy. A corner can be left unsealed so that the liquid crystal material can be injected under a vacuum. Once the article has been filled with liquid crystals, the corner can be sealed and polarizers can be applied to the exposed support surfaces, if desired.

In certain embodiments, the liquid crystals can be aligned similar to other methods of alignment commonly implemented in liquid crystal display technologies. For in-plane switching (IPS), the electric field can be applied through each end of the crystal, but two transistors for each pixel are used instead of the single transistor used for a standard thin-film transistor (TFT) display. In some examples, advanced fringe field switching (AFFS) can be used in the modulator. AFFS is similar to IPS but can provide higher luminosities and provide wider viewing (emission or receipt of incident radiation) angles. In other examples, vertical alignment (VA) can be used in which the liquid crystal material naturally exists in a vertical state removing the need for extra transistors that are used in IPS. When no voltage is applied, the liquid crystal cell remains perpendicular to the substrate creating an opaque condition, e.g., is in the "on" state. When voltage is applied, the liquid crystal cells shift to a horizontal position, parallel to the substrate, allowing light to pass through and create a transparent condition, e.g., is in the "off" state. In some examples, the liquid crystals can be configured for operation in a blue phase mode to improve the temporal response of the liquid crystals. For example, cholesterol or cholesteric compounds, e.g., those providing double twist structures, can be added to the liquid crystals to provide for faster response times for the modulator.

In other examples, the modulator can include one or more nanoparticles, nanostructures or nanosystems (collectively referred to herein in certain instances as "nanomaterials"). In certain embodiments, the nanomaterials can be present in an effective amount to permit the modulator to have different optical properties in the absence and presence of one or more perturbations such as an electric field, magnetic field or other fields. Illustrative nanomaterials include but are not limited to carbon based nanomaterials such as, for example, those made using carbon black, a fullerene, graphite, a carbon nanocluster, a carbon nanohorn, a carbon nanowire, a carbon nanorod, a carbon film, a covalent carbide, a metallic carbide, a carbon nitride, a nanoporous carbon, a carbon foam, a carbon aerogel and a carbon nanocrystal. In some embodiments, the modulator may include one or more nanocomposites such as, for example, a polymer matrix nanocomposite, a ceramic matrix nanocomposite, a metal matrix filled with nanopolymer composites, a core shell nanoparticle, quantum dots, a nanoceramic coating, a nanoclay, a polymer matrix filled with a nanoclay, a polymer matrix filled with nanofibers, a polymer matrix filled with a nanotube, a polymer matrix filled with metal and ceramic nanoparticles, a polymer-DNA complex, a dendrimer nanocomposite, a cerium-oxide nanocomposite, a polymer-carbon nanotube-nanoparticle composite and the like. In certain embodiments, the modulator may include one or more metals or metal alloys including ferrous and non-ferrous metals. Illustrative metal and metal alloy materials include, but are not limited to, copper, a copper alloy, nickel, a nickel alloy, zinc, a zinc alloy, cobalt, a cobalt alloy, zirconium, a zirconium alloy, a noble metal (e.g., silver, gold, platinum, palladium, etc.), a noble metal alloy, iron, an iron alloy, a magnetic iron based alloy, titanium, a titanium alloy, titanium-aluminum, or other combinations of metals. In some examples, the modulator can include one or more biological nanomaterials including, but not limited to, self-assembling biological materials (e.g., peptides, proteins, DNA, RNA), a nucleic acid, a carbohydrate, a lipid, a metal-protein complex (e.g., a cytochrome, bacteriorhodopsin, a phyco-complex) or other biological materials. Where a biological material is used, the conformation of the biological material can be altered to change the resulting optical properties of the modulator. In some examples, such alteration can be performed by altering the temperature, altering the ionic strength or altering an electric field provided to the biological material.

In certain embodiments, the illustrative materials described herein can be used to alter the optical properties of the modulator or may be used to provide for structural support of the modulator or both. For example, certain metals or metal alloys can be used to provide a base support structure that is strong enough to hold or retain the detector or other components of the system. Where the modulator is deposited as a thin film, the modulator may be deposited on a support structure which itself may be operative to modulate light or radiation in some manner, e.g., absorb incident radiation at non-desired angles. Illustrations of thin film modulators are described in more detail herein.

In further examples, the modulator can include one or more quantum dots. Without wishing to be bound by any particular scientific theory, a quantum dot is a material whose excitons are confined spatially. When the quantum dot is produced using a semiconductor material, the resulting properties are generally between those of a semiconductor and a discrete molecule. In some examples, quantum dots can be selected such that they can be effective to filter out certain types of light or otherwise modulate the passage of light in some manner. In other examples, quantum dots can be used to shift the wavelength of light. For example, it may be desirable to red-shift certain non-desired light such that it can be absorbed by another optical component in the system or otherwise not reach the detector. In some examples, the quantum dots can be used by themselves or can be used in combination with one or more other filters to provide a desired response. Illustrative materials that can be used to provide quantum dots include, but are not limited to, lead selenide, cadmium selenide, cadmium sulfide, indium arsenide, indium phosphide and other binary alloys or ternary alloys such as, for example, cadmium selenide sulfide. Additional suitable materials will be readily selected by the person of ordinary skill in the art, given the benefit of this disclosure.

In certain examples, the modulator can include a dopant which may be added in an effective amount to alter the properties of the modulator. For example, where the modulator takes the form of TN liquid crystals, the crystals can be doped with a sterically hindered structure, a nanoparticle or a nanosystem to alter the response of the liquid crystals to an electric field. In some instances, the dopant may be independently modulated such that a binary modulator is provided with each of the modulators being effective to alter the optical properties of the system in at least some manner. In certain configurations, the modulators may work cooperatively such that their optical response is generally the same, whereas in other configurations the modulators may be effective to function differently so that additional tuning of the optical properties of the system are provided. In addition, where a dopant is present, the dopant is typically present in a minor amount, e.g., less than 50%, by weight, but it may be present in a substantially similar amount as the modulator.

In certain embodiments, the systems described herein also include one or more detectors optically coupled to the modulator and/or emitter to detect imaging signals and dosimetry signals depending on the exact state or mode of the system. The particular detector selected for use in the system can depend, at least in part, on the type of radiation or energy provided by the emitter. Illustrative types of detectors include, but are not limited to, rare earth screens, semiconductor detectors, flat panel detectors, CMOS based detectors, camera detectors, CCD detectors, image intensifiers, photographic plate, Geiger counters, scintillators, direct semiconductor detectors, scintillator plus semiconductor detectors and other types of detectors that can be used in imaging and/or radiotherapy applications.

In some examples where the detector is configured as a scintillator or includes a scintillator, the scintillator may be effective to absorb X-ray photons and emit the energy in the form of light, e.g., visible or ultraviolet light. The emitted light can be detected using a photomultiplier tube or other suitable devices as described herein as an indirect way to measure the X-ray energy. Illustrative types of scintillators include, but are not limited to, gadolinium oxysulfide, cesium iodide, sodium iodide, and other suitable materials.

In certain embodiments, the detector can include one or more sensors such as, for example, a CCD sensor or a CMOS sensor. The sensor is desirably operative to receive or capture light and convert the received or captured light into an electrical signal. In certain embodiments, a CCD image sensor is an analog device that holds a small electrical charge in each photo sensor when light strikes the sensor. The charges are converted to voltage one pixel at a time as they are read from the chip. Additional circuitry can be used to convert the read voltage into digital information that can be used to provide an image or a measure of radiation dose. A CMOS sensor is an active pixel sensor produced using CMOS semiconductor processes. Extra circuitry next to each photo sensor converts the light energy to a voltage. Additional circuitry on the CMOS chip may be included to convert the voltage to digital data which can be used to provide an image or a measure of radiation dose. In some examples, a CCD/CMOS hybrid architecture can be used in the detector, e.g., sCMOS, which comprises CMOS readout integrated circuits (ROICs) that are bump bonded to a CCD imaging substrate. Alternatively, the fine dimensions available in modern CMOS technology can be used to implement a CCD like structure entirely in CMOS technology. This result can be achieved, for example, by separating individual poly-silicon gates by a very small gap. Additional configurations where a CCD architecture, a CMOS architecture or combinations and variants thereof can also be used in the systems described herein.

In certain examples, the detector can be configured as a direct semiconductor detector comprising, for example, amorphous selenium (a-Se), silicon, silicon doped with lithium, germanium, germanium doped with lithium, cadmium telluride, cadmium zinc telluride or other suitable semiconductor materials. In operation, X-rays are received by the detector and converted into electron-hole pairs. The electron-hole pairs are collected to detect the X-rays. To prevent undesired thermal emission in the absence of incident X-rays, it may be desirable to cool the semiconductor detector such that overall sensitivity and accuracy is improved. Cooling may be performed using suitable thermal devices, e.g., Peltier coolers, using refrigeration techniques or using cold materials such as liquid nitrogen or liquid helium.

In some examples, the detector can be configured as a scintillator plus semiconductor detector. For example, the detector can include a scintillant screen that is effective to convert X-rays to visible light which can be provided to an array detector such as an indirect flat panel detector, a CCD array or a CMOS array. Where the array is configured as an amorphous silicon flat panel detector, the array can include a sheet of glass or ceramic material covered with a thin layer of silicon that is in an amorphous or non-ordered state. The silicon can be imprinted with a plurality of transistors arranged in an ordered array, e.g., in a transistor grid. These thin film transistors (TFTs) can be coupled to a light absorbing photodiode to provide a pixel element. As light emitted by the scintillator is incident and absorbed by the photodiode, the photons are converted into charge carriers, e.g., electron-hole pairs. As the intensity of the light increases, there is an increase in the number of charge carriers. An electrical pattern can be created and converted to a voltage and digital signal. The digital signal can be used to reconstruct a digital image which may be displayed on a screen or output to another device. Using a scintillator plus semiconductor detector in combination with a modulator as described permits indirect detection of X-rays in imaging applications and direct detection of radiation doses in radiotherapy applications. The ability to use a single detector to image and in radiotherapy measurements provides a significant attribute in both imaging and radiotherapy applications.

In certain configurations, the detector may include or be configured as an X-ray image intensifier. In a typical configuration, an X-ray image intensifier can convert X-rays into a visible light output or converts the pattern of X-rays into an image which can be viewed on screen or by using conventional film development processes, e.g. using silver halide films and film development processes.

In certain embodiments, a photostimulable phosphor can be used as a detector. The phosphor can be configured as a phosphor screen or plate that receives X-rays. After X-rays are incident on the phosphor, the phosphor becomes excited and is trapped in the excited state in a glass plate. As light is emitted from the excited phosphor, it can be collected using a photomultiplier tube, a camera, a charged coupled device such as a CCD camera or other suitable devices. The light signals can be converted into digital signals which can be used to provide a digital image. Laser stimulation of the excited phosphor may be used to permit decay of the phosphor to its ground state.

In certain examples, while a single detector can be used for both imaging and dosimetry applications, the detector is not necessarily positioned in the same manner or used in the same way for different applications. For example, the detector can be rotated and exposed from a different angle or from a different side if desired. In some examples, the detector can be rotated such that a back side of the detector, e.g., a support structure, is exposed first to incident radiation. In certain embodiments, the support structure or structures can be used as, or configured to be, build up plates or include a water equivalent solid material for accurate dosimetric measurements. In such configurations, the modulator typically is in an opaque configuration such that indirect detection of X-rays is not performed.

In some examples, the detector may be or may include one or more flat panel detectors commercially available from PerkinElmer Health Sciences, Inc. including, but not limited to, amorphous silicon flat panel detectors, a detector from the XRD family of detectors or a digital X-ray detector commercially available from PerkinElmer Health Sciences, Inc. Illustrative detectors include, for example, am 8 inch XRD detector, which offers high-speed, real-time imaging up to 30 fps for real time imaging, energy ranges from 20 keV-450 keV and 16-bit digital resolution of 200 or 400 micron pixel size and an image size of 1024×1024 pixels. Another illustrative detector is a 16 inch XRD detector, which offers high-speed, real-time imaging up to 30 fps, radiation energies from 20 keV to 15 MeV and 16-bit digital resolution of 200 or 400 micron pixel size and an image size of 2048×2048 pixels. Additional suitable detectors are commercially available from PerkinElmer Health Sciences, Inc. or other commercial sources.

In some embodiments, the detectors can be used alone or used with one or more accessory devices such as a power supply, a frame grabber, electric motors, hydraulic motors or other suitable accessory devices that can position a detector in a desired manner, provide a desired output from the detector or provide a signal to modulate the signal received by the detector or received from the detector. Additional suitable accessory devices will be readily selected by the person of ordinary skill in the art, given the benefit of this disclosure.

In certain configurations of the system described herein, the emitter can be an X-ray source, the modulator can be configured as TN liquid crystals and the detector can be configured as, or include, an amorphous silicon (a-Si) flat panel detector. In operation of the system, an imaging signal is provided to the detector when the TN liquid crystals are in their off state such that no electric field is provided to the crystals. When the TN liquid crystals are in their off state, the imaging signal is incident on a scintillator which causes emission of visible light for detection by the amorphous silicon flat panel detector. A dosimetry signal is provided to the detector when the TN liquid crystals are in their on state, e.g., when an electric field is provided to the liquid crystals. When the TN liquid crystals are in their on state, light emitted by the scintillator will be blocked. The flat panel detector response will be based on direct detection of X-ray photons with scintillator emission having no or little contribution to the signal. Where TN liquid crystals are used, they can be deposited in a thin film at the surface of the flat panel detector, e.g., adjacent to or near photodiodes of the panel, without the need for etching or pixelating the detector. Suitable materials can be used to provide electrical contact between the liquid crystals and a power or field source, e.g., indium tin oxide, silver or other suitable conductive materials.

Figure 2:
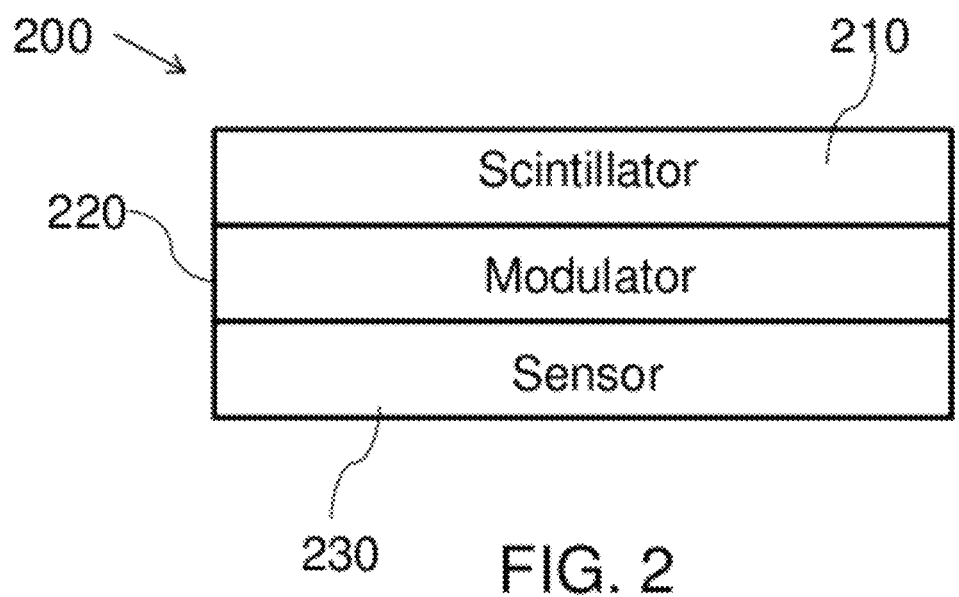
FIG. 2 is an illustration of a detector with an integral modulator, in accordance with certain examples.

In certain examples, the modulator can be integrated into the detector such that the system comprises two large components, e.g., an emitter and a detector. One illustration of a modulator integrated into a detector is shown in FIG. 2. Referring to FIG. 2, the detector 200 comprises a scintillator 210, a modulator 220 and a sensor 230. The scintillator 210 is optically coupled to the modulator 220 and may be in direct contact with the modulator 220, e.g., disposed as a thin film on the modulator or may be separated in space from the modulator 220. The modulator 220 is also optically coupled to the sensor 230, which may take many different forms, e.g., a-Si panel, a CCD sensor, a CMOS sensor, etc. In certain configurations, the modulator 220 can be deposited or otherwise disposed on a window or aperture of the sensor 230 such that any light energy reaching the detector must first pass through the modulator 220. In other configurations, the modulator 220 can be separate so that it may be switched out or substituted with a different modulator. In some examples, the modulator may be integral to a lens or shutter that is optically coupled to the sensor 230. If desired, different modulators can be used by switching the lens or shutter of the sensor. Additional configurations are also possible and will be recognized by the person of ordinary skill in the art, given the benefit of this disclosure.

In certain embodiments, the detector of the systems described herein is typically coupled to a computer or other processing device for construction of an image from the imaging signals. The computer may include or be used with suitable circuitry such as analog-to-digital converters to provide a desired signal.

In some configurations, the system can include a controller comprising a processor, associated circuitry and the like. The controller can be electrically coupled to other components of the system, e.g., a detector, through an interface or interconnect, which typically is a bus such as a serial bus. The controller can be electrically coupled to a power supply. In operation, the controller can send and receive signals from the various components of the system. For example, the controller may send a signal to initialize a voltage source to provide an electric field to the modulator. In certain examples, the controller can include at least one processor optionally electrically coupled to one or more memory units. In certain examples, the controller may be a larger part of a computer system. The computer system may be, for example, a general-purpose computer such as those based on Unix, Intel PENTIUM-type processor, Motorola PowerPC, Sun UltraSPARC, Hewlett-Packard PA-RISC processors, or any other type of processor. In some examples, the processor may be an inexpensive processor that may be programmable to receive inputs and determine radiation doses or levels based on the received inputs. It should be appreciated that one or more of any type computer system may be used according to various embodiments of the technology. Further, the system may be located on a single computer or may be distributed among a plurality of computers attached by a communications network. A general-purpose computer system may be configured, for example, to perform any of the described functions including but not limited to: dosimetry measurements, imaging construction, imaging display and the like. It should be appreciated that the system may perform other functions, including network communication, and the technology is not limited to having any particular function or set of functions.

In certain examples, the systems described herein can be implemented with specialized software executing in a general-purpose computer system. The computer system may include a processor electrically coupled to one or more memory devices, such as a disk drive, memory, or other device for storing data. The memory is typically used for storing programs and data during operation of the computer system. Components of computer system may be coupled by an interconnection device, which may include one or more buses (e.g., between components that are integrated within a same machine) and/or a network (e.g., between components that reside on separate discrete machines). The interconnection device can provide for communications (e.g., signals, data, instructions) to be exchanged between system components of the system. The computer system typically is electrically coupled to the emitter, the modulator and the sensor such that electrical signals may be provided from the sensor to the computer system for storage and/or processing and so the emitter and modulator can be controlled by the computer system. If desired, the computer system may also include one or more input devices, for example, a keyboard, mouse, trackball, microphone, touch screen, manual switch (e.g., override switch) and one or more output devices, for example, a printing device, display screen, speaker. In addition, the computer system may include one or more interfaces (not shown) that connect the computer system to a communication network (in addition or as an alternative to the interconnection device. In some examples, the storage system of the computer system typically includes a computer readable and writeable nonvolatile recording medium in which signals are stored that define a program to be executed by the processor or information stored on or in the medium to be processed by the program. For example, starting radiation doses, X-ray intensity levels, dosage times and the like used in certain embodiments disclosed herein may be stored on the medium. The medium may, for example, be a disk or flash memory. Typically, in operation, the processor causes data to be read from the nonvolatile recording medium into another memory that allows for faster access to the information by the processor than does the recording medium. This memory is typically a volatile, random access memory such as a dynamic random access memory (DRAM) or static memory (SRAM). It may be located in storage system or in a memory system. The processor generally manipulates the data within the integrated circuit memory and then copies the data to the medium after processing is completed. A variety of mechanisms are known for managing data movement between the medium and the integrated circuit memory elements, and the technology is not limited thereto. The technology is also not limited to a particular memory system or storage system.

In certain examples, the computer system may also include specially-programmed, special-purpose hardware, for example, an application-specific integrated circuit (ASIC). Aspects of the technology may be implemented in software, hardware or firmware, or any combination thereof. Further, such methods, acts, systems, system elements and components thereof may be implemented as part of the computer system described above or as an independent component. Although the computer system is described by way of example as one type of computer system upon which various aspects of the technology may be practiced, it should be appreciated that aspects are not limited to being implemented on the specific type of computer system described herein. Various aspects may be practiced on one or more computers having a different architecture or components than that described herein. For example, the computer system may be a general-purpose computer system that is programmable using a high-level computer programming language. The computer system may be also implemented using specially programmed, special purpose hardware. In a typical computer system, the processor is often a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Vista or Windows 7 operating systems available from the Microsoft Corporation, MAC OS System X operating system available from Apple Computer, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software can be configured to implement cognitive architecture, neural networks or other suitable implementations. For example, an imaging database, dosage database or the like can be linked to the system to provide access to initial radiation levels to image a particular area or object or to provide radiotherapy to a particular area or object. Such configuration provides for use of the system with many different types of tissues and objects, which may increase the flexibility and function of the devices, systems and methods disclosed herein. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol. If desired, the computer system can be configured to link or update electronic medical records of a subject automatically without the need for intervention by an end-user or third party service. Also if desired, treatment parameters, images and the like can be provided to a mobile device, e.g., a phone, a tablet device, etc., of a subject so that they may retain such images or treatment parameters for their own records.

In accordance with certain examples, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In certain examples, a user interface may be provided such that a user may enter or recall a level of radiation, prior images, prior dosage routines, or other data desired. For example, in instances where a patient has already received radiotherapy treatment, relevant treatment parameters may be recalled and reused without the need to determine radiation dosages again. Other features for inclusion in a user interface will be readily selected by the person of ordinary skill in the art, given the benefit of this disclosure. The user interface may be displayed on a screen or other visual device to facilitate viewing of images in real-time. In addition, the user-interface can be displayed on a mobile device, e.g., a phone, tablet, etc., that is wirelessly coupled to the computer system to permit remote programming of the system using the mobile device.

In some examples, the systems disclosed herein can be used to sterilize a medical implant or other component or device to be sterilized. For example, a medical implant can be packaged into an opaque container, sterilized by providing X-ray radiation to the implant and subsequently imaged using the same system, if desired. Alternatively, a physician or surgeon can use a single X-ray imaging system to image internal body structures and provide on-site sterilization of an implant to be implanted into a subject. The ability of the systems described herein to measure a radiation dose accurately permits on-site sterilization using a single system that can also provide imaging.

In certain examples, the systems disclosed herein can be used in non-medical applications such as object imaging in airports, military applications, courthouses, or other secure settings, in cameras, in shutters, or in other optical devices. The systems described herein permit measurement of the X-ray levels used and can provide for imaging of objects using the lowest possible X-ray level that provides a suitable image. For example, if the X-ray intensity used is not suitable to image a particular object, the intensity can be increased to a higher level to provide a suitable image. The particular higher level can be detected to make sure it will not damage any electronic items or otherwise be harmful to anything to be imaged. In addition, modulation may be desirable to enhance viewing of different types of structures or structures at different depths in a piece of luggage. If desired, suitable devices that include built in modulators can be designed to work cooperatively with the X-ray device to provide for enhanced safety, e.g., luggage or article may include an embedded modulator rather than the X-ray system itself comprising a modulator.

In certain examples, the systems may be used with other components to provide a desired output from the emitter. For example, the system can also include an ion chamber and/or a grid. In some embodiments, an ion chamber can be placed between the object being imaged and a detector. The ion chamber can be used to determine the level of exposure by measuring the amount of X-rays that pass through an electrically charged plate inside the ion chamber. A grid may be present and placed between the object and the ion chamber. A grid can take numerous forms such as, for example, a series of aluminum slats stacked next to each other. The grid is typically operative to permit non-reflected or straight X-rays to pass through while absorbing reflected X-rays. Image quality can generally be improved using a grid as back scattering of X-rays are prevented or reduced from reaching the detector.

In certain examples, the systems and methods described herein can be used in mammographic applications including imaging and providing radiotherapy to a mass identified from the imaging. In mammography imaging applications, X-rays used have a higher wavelength (and lower energy) compared to X-ray wavelengths used in imaging bone applications. In operation, a breast is placed between two parallel surfaces to even out the thickness of the breast and reduce overall tissue thickness. X-ray imaging may be performed as described herein to identify the presence of any masses or microcalcifications. If identified, an initial treatment can be provided with radiotherapy using the systems described herein or, if desired, traditional biopsy procedures can be performed.

In certain embodiments, the systems disclosed herein can take various forms and sizes depending on the intended use of the system. Where the system is designed for field use in military applications, the system can be configured to be placed in the back of a vehicle or otherwise integrated into a vehicle for use in military applications. In medical settings, the system can be housed in a suitable room that is shielded to prevent radiation from exiting the room or otherwise being provided to non-desired areas. Where the system is used in inspecting the internal contents of luggage or baggage, the system can include an opening to receive the particular article to be inspected. Other sizes and form factors are also possible.

In certain embodiments, the systems described herein can also be used in backscatter X-ray applications, X-ray crystallography applications, X-ray fluorescence applications, fluoroscopy applications or other suitable applications where imaging an object and/or providing a radiation dose to an object is desired.

In additional embodiments, the systems described herein can be used in other non-destructive testing methods and analyses including, but not limited to, inspection of printed circuit boards, inspection of metal castings, pipeline inspection, 3D cone-beam CT, in-line manufacturing inspection, X-ray metrology, film replacement, crystallography, geological applications and archeological applications. Additionally, the systems may be used in other medical and dental procedures including, but not limited to, veterinarian applications, therapy simulations, 3D cone-beam CT, proton/particle therapy and the like. Additional suitable non-destructive testing methods, medical and dental procedures and the like that can be used with the systems, devices and methods described herein will be readily selected by the person of ordinary skill in the art, given the benefit of this disclosure.

In certain embodiments, the modulators described herein can be packaged in an accessory device that can be used with existing X-ray systems. For example, the modulator can be integrated into a vest or device that can be placed over a desired area to be imaged. In other configurations, the modulator can be configured as a screen or plate that can be positioned between an object to be detected and a detector such that non-desired light energy can be filtered out from arriving at the detector in one state and can be provided to the detector in another state. Where the modulator is configured as an accessory device, it can include an on-board power supply, e.g., a battery or fuel cell, or may include suitable interconnects to couple the modulator to a power source, e.g., a battery, fuel cell or AC source.

In certain embodiments, a method of facilitating imaging and radiotherapy using a single detector is provided. In some examples, the method comprises providing a device comprising, and emitter, a modulator and a detector. In certain instances, the modulator can be an optical modulator that is coupled to the emitter and configured to provide an imaging signal in a first state and to provide a dosimetry signal in a second state. In some examples, the modulator is configured to switch between the first state and the second state. In certain embodiments, the detector is operative to receive a signal provided by the modulator and to detect the imaging signal in the first state of the modulator and the dosimetry signal in the second state of the modulator.

In certain examples, a method of facilitating imaging and radiotherapy using a single detector is provided. In some examples, the method comprises providing a detector comprising a scintillant, a modulator and a sensor. In certain examples, the scintillant, modulator and sensor are typically optically coupled to each other. In certain embodiments, the scintillant can be used to provide indirect detection of radiation using an imaging signal. For example, X-rays can be incident on the scintillant and result in emission of light by the scintillant. This light can be provided to the modulator, which depending on its state, can permit passage of the light, block it, attenuate it or otherwise perform some optical operation on the light. Where the detector is configured for imaging, the modulator can be configured to pass the light emitted from the scintillator. Where the detector is configured for radiotherapy, the modulator can be configured to block light from the scintillant and permit passage of X-ray photons from a source.

In certain embodiments, a method of using an X-ray system for imaging and dosimetry can include imaging an object using a modulator present in a first state and providing a radiation dose to the object using the modulator present in a second state. In certain examples, the first state of the modulator can be configured to permit indirect detection of radiation by a sensor, and the second state of the modulator can be configured to permit direct detection of radiation by the sensor. In some examples, the modulator can be configured with a plurality of liquid crystals that can be switched on and off by application and removal of an electric field.

Certain specific examples are described below to illustrate further some of the novel aspects of the technology described herein.

Example 1

Figure 3:
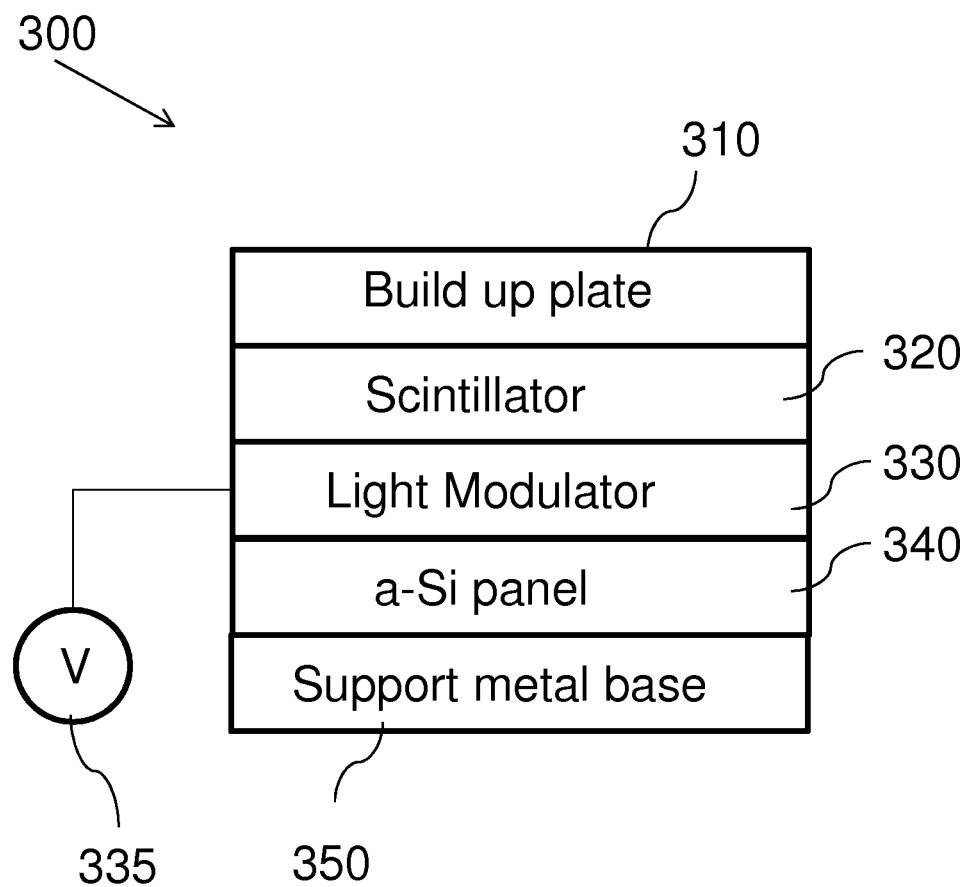
FIG. 3 is an illustration of a modulator present in an optical path between a scintillant and a sensor, in accordance with certain examples.

One illustration of a system comprising a modulator is described below with reference to FIG. 3. The system 300 comprises a build up plate 310, a scintillator 320, a light modulator 330, an amorphous silicon (a-Si) panel, and a support base 350 which can be metal as listed or can be other support materials. As X-rays are incident on the scintillator 320, light is emitted from the scintillator 320. This light can be provided to the light modulator 330, which depending on its state, can pass all light or can perform some optical operation on the light. When the light modulator 330 is configured as a plurality of twisted nematic liquid crystals, application of a voltage from a voltage source 335 can cause the crystals to twist and alter the response of the light modulator 330. In one configuration, when the voltage source 335 is switched off, light from the scintillator 320 can pass through the modulator 330 and is provided to the a-Si panel 340 for detection. When the voltage source 335 is switched on, light from the scintillator 320 can be blocked by the modulator 330 such that light arriving at the a-Si panel 340 for detection is directly from a source such as an X-ray source.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A device comprising:
   an emitter;
   an optical modulator coupled to the emitter and configured to provide an imaging signal in a first state and to provide a dosimetry signal in a second state, in which the modulator is configured to switch between the first state and the second state; and
   a detector operative to receive a signal provided by the modulator and to detect the imaging signal in the first state of the modulator and the dosimetry signal in the second state of the modulator.

2. The device of claim 1, in which the modulator comprises a plurality of liquid crystals.

3. The device of claim 1, in which the modulator comprises nanoparticles, quantum dots or both.

4. The device of claim 1, in which the modulator comprises an optical element.

5. The device of claim 1, in which the optical element comprises a polarizer.

6. The device of claim 1, further comprising a power source configured to provide an electric field to the modulator to switch the state of the modulator.

7. The device of claim 1, further comprising a power source configured to provide a magnetic field to the modulator to switch the state of the modulator.

8. The device of claim 1, in which the detector comprises an amorphous silicon panel.

9. The device of claim 1, in which the detector comprises a charged coupled device or a complementary metal oxide semiconductor (CMOS) device.

10. A device configured to switch between an imaging mode and a dosimetry mode, the device comprising a detector optically coupled to a modulator, the modulator configured to provide a first signal to the detector in the imaging mode and to provide a second signal, different from the first signal, to the detector in the dosimetry mode.

11. The device of claim 10, in which the modulator is configured to provide substantially all light received by the modulator in the imaging mode.

12. The device of claim 10, in which the modulator is configured to block substantially all light received by the modulator in the dosimetry mode.

13. The device of claim 10, in which the modulator comprises a plurality of liquid crystals.

14. The device of claim 10, in which the modulator comprises nanoparticles.

15. The device of claim 10, in which the modulator comprises quantum dots.

16. The device of claim 10, in which the modulator is electrically coupled to a power source effective to switch the modulator from providing the first signal to providing the second signal.

17. The device of claim 10, in which the detector comprises an amorphous silicon panel.

18. The device of claim 10, in which the detector comprises a charged coupled device.

19. A device comprising:
    an emitter;
    an optical modulator coupled to the emitter and configured to provide an imaging signal in a first state, a dosimetry signal in a second state and a hybrid signal comprising a combination of the imaging signal and the dosimetry signal in a third state, in which the modulator is configured to switch between the first state and the second state; and
    a detector operative to receive a signal provided by the modulator and to detect the imaging signal in the first state of the modulator, the dosimetry signal in the second state of the modulator and the hybrid imaging signal in the third state of the modulator.

20. The device of claim 19, in which the modulator comprises a plurality of liquid crystals.

21. The device of claim 19, in which the detector comprises an amorphous silicon panel.

22. The device of claim 19, in which the detector comprises a charged coupled device or a complementary metal oxide semiconductor (CMOS) device.

* * * * *